April 24, 1951           J. E. GAEDE           2,550,238
DEVICE FOR COMPARING TRACES ON SEISMIC RECORDS
Filed Nov. 9, 1948           2 Sheets-Sheet 1
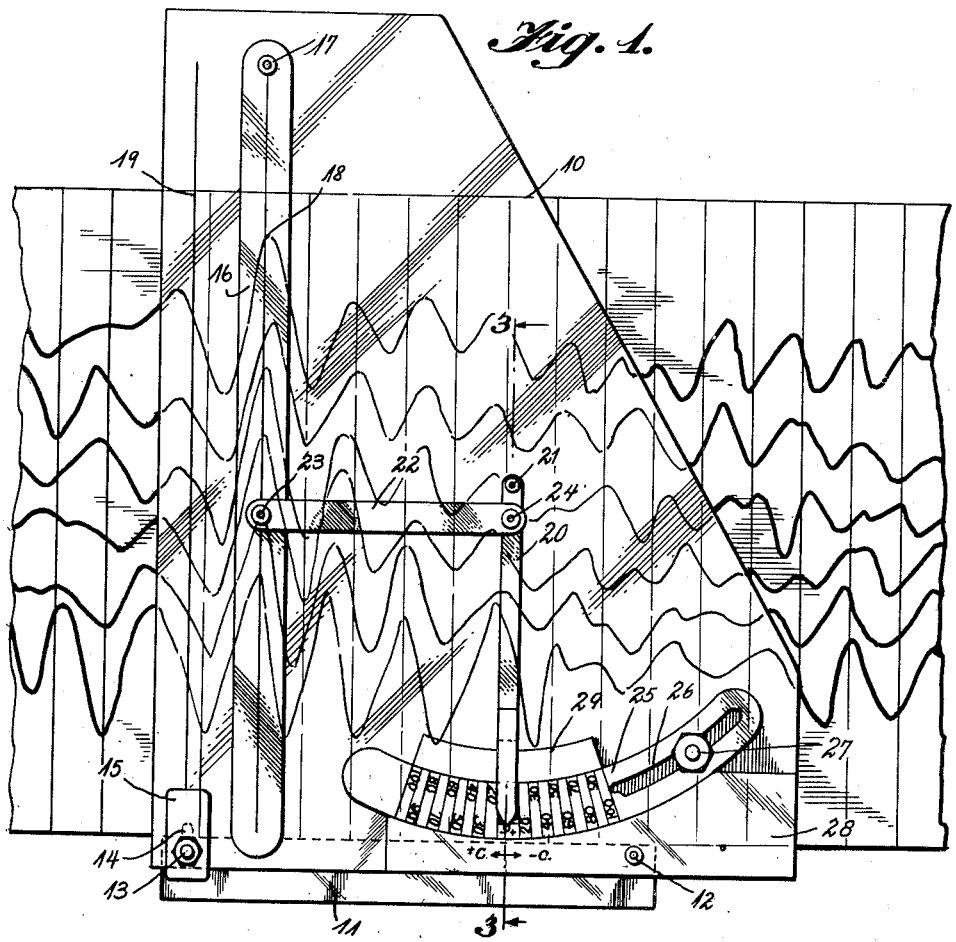
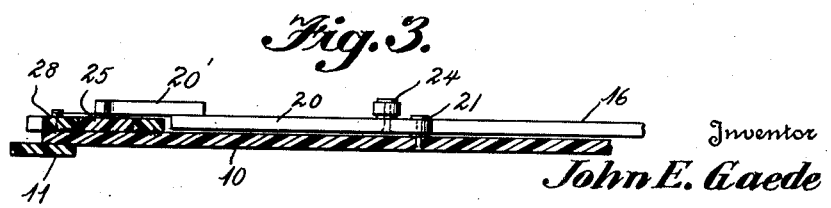
Inventor
*John E. Gaede*
By *Stevens, Davis, Miller & Mosher*
Attorneys April 24, 1951          J. E. GAEDE          2,550,238

DEVICE FOR COMPARING TRACES ON SEISMIC RECORDS

Filed Nov. 9, 1948          2 Sheets—Sheet 2

Inventor
John E. Gaede

By Stevens, Davis, Miller & Mosher
Attorneys

Patented Apr. 24, 1951

2,550,238

UNITED STATES PATENT OFFICE 2,550,238

DEVICE FOR COMPARING TRACES ON SEISMIC RECORDS

John E. Gaede, Trochu, Alberta, Canada, assignor to Geophysical Service, Inc., Dallas, Tex., a corporation of Delaware Application November 9, 1948, Serial No. 59,125

6 Claims. (Cl. 33—1)

This invention relates to devices for interpreting seismic records and particularly to such a device for use in field work in connection with geophysical prospecting.

In such prospecting it is common practice to detonate a charge of explosive at some point on the earth's surface and to record the seismic waves arriving at each of a series of points spaced from the point of detonation of the explosive, usually along a straight line extending outward from the point of explosion. The detected seismic waves are then amplified and recorded, usually photographically, and usually on a strip of photographic paper about six inches wide.

This paper is generally in the form of a long strip with timing lines extending laterally across it and traces indicative of the detected seismic wave extending lengthwise. Generally the seismic detector located closest to the point of explosion is connected to record as the top trace and the seismic detector located furthest away from the point of explosion is connected to record as the bottom trace, with the intermediate detectors connected, in sequence to the intermediate traces.

The seismic records thus made are preserved and carefully interpreted, usually at the home office of the prospecting company but it is desirable to make some fairly accurate interpretations in the field at the time the records are made. Thus it is common practice to compare the top and the bottom trace on a seismic record, in the field, for the purpose of determining the dip or inclination in the strata of special interest. Since it is impractical to engage in extended calculations in the field and since it is also impractical to carry complicated equipment for making this comparison between the top trace and bottom trace of a seismic record, the need arises for a simple instrument capable of quickly and easily comparing such traces. It is further desirable that such an instrument be adjustable to compensate for the effects of the weathered layer at the surface of the earth.

In seismic records of the type mentioned above the top trace and the bottom trace will ordinarily be quite similar except for the fact that the peaks and valleys of the bottom trace will be offset laterally a small but finite distance from the corresponding peaks and valleys in the top trace.

It is the purpose of this invention to provide a simple, inexpensive instrument that will quickly and easily measure the small differences in time between the top and the bottom traces, which are commonly referred to as "the move-out time" or "Delta-T." It is also a purpose of this invention to provide an adjustable compensation in the measurements made by this device for the effects of the weathered layer.

The present device is comprised broadly of a flat plate, preferably of transparent material, and of sufficient dimensions that it will extend completely or at least substantially completely across the type of seismic record with which it is to operate. Along the lower edge of this plate and on the under side is fastened a guide means so that the plate may be accurately positioned by running the guide means up against the lower edge of the seismic record. Preferably this guide means consists of a flat strip of material pivoted at one end to the plate and adjustably clampable to the plate at the other end. Obviously the plate can work from the top edge of the seismic record instead of from the bottom edge if so desired.

Attached to the plate is an elongated member pivoted somewhere along its length, and preferably at one end, to the plate. This elongated member is lined up with the peaks or valleys of the bottom and top traces which it is desired to compare. Obviously it may be lined up with any other portions of the traces which it is desired to compare. It has been found expedient to make this elongated member of transparent material and place on it a line which can be used for alignment purposes. By placing this line on the under surface of the elongated member and making this member transparent, the possible effect of having the eye of the observer off line can be minimized.

Connected to the elongated member is a link which operates an indicator which is also mounted on the base plate. This indicator can be in the form of a pointer pivoted to the base plate and pivotally connected to the link at some point other than the point at which it is mounted on the base plate. Preferably the point of pivoting of the indicator and the point of its connection to the link are relatively close together so that considerable movement of the end of the pointer is had for relatively small movement of the elongated member.

Mounted on the base plate is a reference for the indicator. This may be a scale when the indicator is a pointer, or if the indicator is in the form of a dial or scale, the part mounted on the base plate to cooperate with it may simply be a marker. In either event it has been found in most instances to be desirable to mount the reference or cooperating part on the base plate so that it can be adjusted as to position to compensate for the weathered layer of the earth. Thus, when a pointer is used and a scale is positioned on the base plate to cooperate with the pointer, it has been found desirable to make this scale in the form of an arcuate section and to mount it in guides in which it may slide and to provide clamping means to clamp it in any desired position.

In addition to these features it has been found desirable in most instances to provide a straight line on the base plate extending laterally of the seismic record for the purpose of alignment and also to provide a second such line on the base plate directly under the pivot point of the elongated bar so that this bar may be accurately aligned with the base plate and the movable scale set while that alignment is maintained.

Further details and advantages of this invention will be apparent from the following detailed description and the illustrations of several possible embodiments thereof.

In the drawings,

Figure 1 is a plan view of the preferred embodiment of the device of this invention;

Figure 2 is an elevational view of this device taken from the bottom end;

Figure 3 is a sectional view of a part of the device of Figure 1 taken along the line 3—3 of Figure 1.

Figure 4:
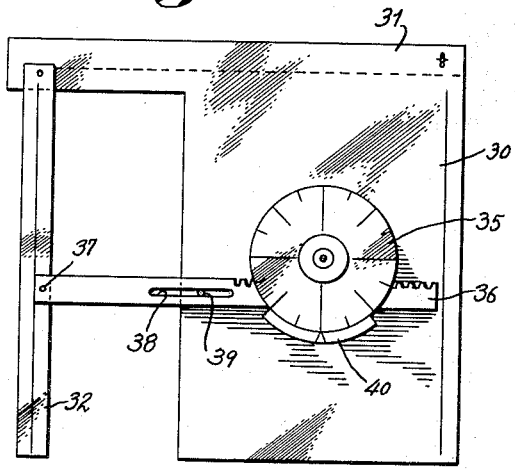
Figures 4, 5, 6 and 7 are plan views of modified forms of the device of this invention.

As illustrated in Figures 1 to 3, inclusive, the device of this invention is constructed of a plastic sheet material which is transparent and of sufficient thickness so that it will have the required degree of rigidity. Transparent plastic sheet materials of $\frac{1}{64}$ to $\frac{1}{32}$ of an inch thickness have been found satisfactory for this purpose. The base 10 of the device is formed of a rectangular piece of this sheet material with one unnecessary corner cut away and is generally about five inches long and about six and a half inches wide. Obviously this size will vary as the size of the seismic records to be inspected varies.

Attached to the underside of the base 10, along its lower edge, is a strip 11 of the same kind of transparent plastic sheet material. This strip 11 is pivotally fastened to the base plate 10 by a pin 12 located near one of its ends and is adjustably fastened to the base plate at its other end by a small nut and bolt 13 which passes through the strip 11, and through a slot 14 in the base plate 10. A small piece of transparent material 15 is placed on top of the base plate and held in position by this same nut and bolt 13 to act as a stop for the aligning member which will be described later. Once the strip 11 has been adjusted and locked in position on the base plate 10 it serves as a guide for the lower edge of the seismic record being inspected and thus positions the seismic record accurately with respect to the device of this invention.

Mounted upon the upper surface of the base plate 10 and extending nearly across it is an elongated aligning member 16. This member is pivotally connected to the base plate by a pin 17 near its upper end. In operation, this elongated member 16 is aligned with the corresponding peaks or valleys of the seismic traces under inspection and this may be accomplished either by aligning one of the edges of this elongated member with the desired peaks or valleys or by providing a straight-line marker on the elongated member 16. As illustrated, a line 18 is placed on the under side of the elongated member 16 for this purpose.

It has usually been found desirable to place a similar line on the base plate passing through the pivot point 17 and extending across the base plate at right angles to its lower edge. Since this line lies directly under the line 18 in Figure 1, it cannot be seen. It has also been found desirable in most instances to have an additional line on the base plate at right angles to its lower edge and displaced laterally from the first-mentioned line. Such a line is indicated at 19 on the base plate 10.

In order that the position of the longated member 16 be accurately indicated, a pointer 20 is mounted on the base plate 10 and pivoted at its upper end on a pin 21 fixed to the base plate 10. This pointer 20 is connected to the elongated member 16 by a link 22 by being pinned at one end by a pin 23 to the elongated member 16 and pinned at the other end by pin 24 to the pointer 20. These pin connections permit the pivoting of the link with respect to the elongated member 16 and the pointer 20 and are so positioned relative to the pivot points of the elongated member 16 and the pointer 20 that the pointer 20 will move a considerable distance for a relatively small movement of the elongated member 16.

The pointer 20 is made in two parts, the upper part 20 lying close to the base plate 10 and the lower part or pointer hand 20' being raised somewhat from the base plate 10 by being cemented on top of the upper part of the pointer 20. The lower part of the pointer 20' is pointed so as to give an accurate indication. Under this lower part of the pointer 20' is positioned an arcuate scale 25, also made from a piece of the same type of plastic sheet material. This scale is formed with an arcuate slot 26 near one end and a bolt and nut 27 are passed through a hole in the base plate 10 and through the arcuate slot 26 so as to fasten the arcuate scale member in position. By loosening this bolt and nut, the scale member can be adjusted to any desired position and the bolt and nut tightened to hold it there. A guide member 28 is provided below the arcuate scale member and a guide 29 is provided above the arcuate scale member, both fastened to the base plate. The arcuate scale member 25 is marked off in appropriate divisions and indications.

Numerous modifications of the specific design illustrated in Figures 1 to 3, inclusive, may be made. Figures 4 to 7, inclusive, illustrate some of these possible modifications. Thus, in Figure 4, there is a base plate 30 similar to the base plate 10 in Figures 1 to 3, inclusive, a positioning strip 31 and an elongated member 32. However, instead of elongated member 32 overlying the base plate, it extends across the record but the base plate is cut away under it. Also in Figure 4, the position of the elongated member 32 is indicated not by a pointer but by a dial 35 which is operated by a rack 36 connected by pin 37 to the elongated member 32. A slot 38 in this rack cooperates with a pin 39 on the base plate to guide the rack and a gear (not shown), connected to the dial 35, cooperates with the teeth on the rack to operate the dial. An indicator 40 mounted on the base plate serves to indicate the position of the dial and this may be made adjustable as in the embodiment shown in Figures 1 to 3, inclusive.

Figure 5:
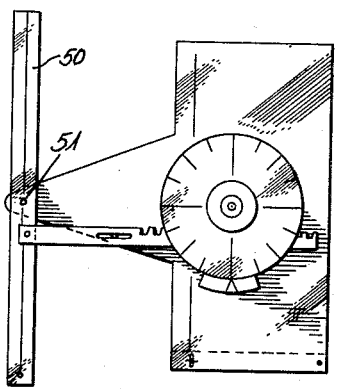

A similar arrangement is shown in Figure 5 except that the elongated bar 50 is pivoted at a central point 51. This device is otherwise similar to the device illustrated in Figure 4.

Figure 6:
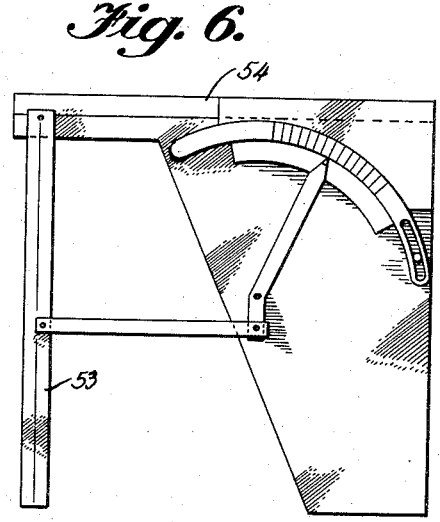

In Figure 6 is illustrated a device in which the elongated bar 53 is pivoted at one end to the base plate 54 but the base plate 54 is cut out under the bar 53 so that the bar 54 lies immediately adjacent the record. In this embodiment, a pointer and scale similar to those utilized in Figures 1 to 3 inclusive, are utilized.

Figure 7:
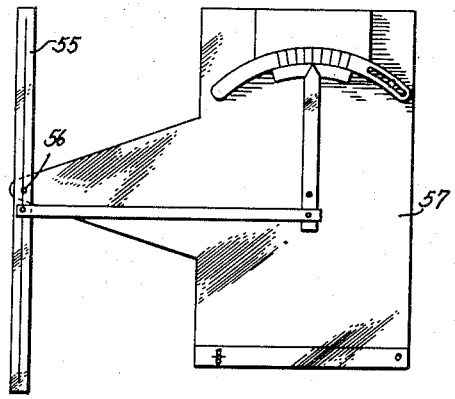

Figure 7 is similar to Figure 6 except that the elongated bar 55 is pivoted at a mid-point 56 to the face member 57.

What is claimed is:

1. A device for comparing traces on a seismic record that comprises a transparent flat plate adapted to be positioned upon a seismic record, guide means on the under surface of said plate for positioning said plate with respect to an edge of the seismic record, an elongated transparent member pivotally mounted on said plate so as to extend across said seismic record, said member being inscribed with a straight line extending lengthwise thereof, a link pivotally connected to said elongated member at a point removed from the point at which said member is connected to the plate, indicating means mounted on said plate and connected to said link so as to be moved thereby and a scale on said plate cooperating with said indicating means to indicate the position of said indicating means relative to said plate.

2. A device for comparing traces on a seismic record that comprises a flat transparent plate adapted to be positioned upon a seismic record, guide means on the lower surface of said plate for positioning said plate with respect to an edge of the seismic record, an elongated transparent member pivotally mounted near one end of said plate so as to extend across said seismic record, said member being inscribed with a straight line extending lengthwise thereof, a link pivotally connected to the elongated member at a point removed from the point at which it is connected to the plate, a pointer pivotally mounted on said plate and pivotally connected to said link at a point removed from its point of mounting, and a scale slidably mounted on said plate in a position to cooperate with said pointer.

3. A device as defined in claim 2 in which means are provided for locking the slidably mounted scale in position on the plate.

4. A device as defined in claim 1 further characterized in that the guide means on the lower surface of the plate is an elongated strip of transparent material pivotally connected to the plate at one end and adjustably clampable to the plate at the other end.

5. A device as defined in claim 1 in which the plate is inscribed with a straight line that will extend across the seismic record at right angles to the edge thereof when the plate is positioned on the seismic record, this line being useful for the purpose of adjusting the device.

6. A device as defined in claim 1 in which the scale is an arcuate member and contains an arcuate slot and in which a nut and bolt are passed through the plate and the slot in the arcuate member for clamping the arcuate member in position.

JOHN E. GAEDE.

REFERENCES CITED

The following references are of record in the file of this patent:

UNITED STATES PATENTS

| Number | Name | Date |
|---|---|---|
| 1,154,673 | Van Ness | Sept. 28, 1915 |
| 2,144,812 | Rieber | Jan. 24, 1939 |
| 2,304,965 | Sproule | Dec. 15, 1942 |
| 2,451,856 | Miller | Oct. 19, 1948 |

FOREIGN PATENTS

| Number | Country | Date |
|---|---|---|
| 381,613 | Great Britain | Oct. 13, 1932 |